(12) United States Patent
Miyashita

(10) Patent No.: US 8,212,956 B2
(45) Date of Patent: Jul. 3, 2012

(54) ELECTRO-OPTIC DEVICE AND ELECTRONIC APPARATUS HAVING PARTICULAR MOUNTING CASE

(75) Inventor: Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 556 days.

(21) Appl. No.: 12/539,790

(22) Filed: Aug. 12, 2009

(65) Prior Publication Data

US 2010/0091213 A1 Apr. 15, 2010

(30) Foreign Application Priority Data

Oct. 9, 2008 (JP) ................................ 2008-263144

(51) Int. Cl.
*G02F 1/1333* (2006.01)
*G02F 1/1335* (2006.01)

(52) U.S. Cl. ............................................. 349/58; 349/5

(58) Field of Classification Search .................... 349/58, 349/5
See application file for complete search history.

(56) References Cited

U.S. PATENT DOCUMENTS

| 6,411,353 | B1 * | 6/2002 | Yarita et al. ..................... 349/59 |
| 2004/0212755 | A1 * | 10/2004 | Fukayama et al. .............. 349/58 |
| 2010/0123850 | A1 * | 5/2010 | Miyashita ....................... 349/58 |

FOREIGN PATENT DOCUMENTS

| JP | 2000-181372 A | | 6/2000 |
| JP | 3583062 B | | 4/2002 |
| JP | 2002107698 A | * | 4/2002 |
| JP | 2006-48019 A | | 2/2006 |

* cited by examiner

*Primary Examiner* — Mike Qi
(74) *Attorney, Agent, or Firm* — AdvantEdge Law Group, LLC

(57) ABSTRACT

An electro-optic device includes an electro-optic panel and a mounting case. The mounting case includes a frame, a first cover member and a second cover member. The second cover member has an elastic portion for pressing the electro-optic panel against the first cover member.

13 Claims, 14 Drawing Sheets

ELECTRO-OPTIC DEVICE AND ELECTRONIC APPARATUS HAVING PARTICULAR MOUNTING CASE

BACKGROUND

1. Technical Field

The present invention relates to a technical field of an electro-optic device which is used as a light valve of a liquid crystal projector and includes an electro-optic panel such as a liquid crystal panel and a mounting case for mounting or accommodating the electro-optic panel, and an electronic apparatus such as a liquid crystal projector including the electro-optic device.

2. Related Art

As disclosed in Japanese Patent No. 3583062, for example, an electro-optic device, which includes an electro-optic panel such as a liquid crystal panel and a mounting case for mounting or accommodating the electro-optic panel, is used as a light valve such as a liquid crystal projector. The mounting case includes a frame and a plate-shaped member, for example. The electro-optic panel is mounted and accommodated in the plate-shaped member such that the circumference thereof is covered by the shape of the frame.

According to Japanese Patent No. 3583062, the liquid crystal panel mounted in the mounting case is provided with light-shielding plates on both the surfaces of a light incident side and a light output side which projection light is incident on and output from, respectively, in a liquid crystal projector.

Here, the frame is provided with a window section defining a window so as not to shield light incident on and output from an effective picture of the electro-optic panel. On the other hand, light incident on and output from an area other than the effective picture of the electro-optic panel is shielded by the window section. Since the window section is incorporated with a wall forming the frame, it is difficult to adjust the thickness of the window section to make the window section thin up to a predetermined value in a manufacturing process.

For example, in the liquid crystal projector, the electro-optic device is cooled by a cooling wind, for example, in order to prevent a considerable increase in the temperature due to strong projection light incident from a light source. When the thickness of the window section described above is increased, a stepped portion occurring between the surface of the electro-optic panel and the surface of the window section is also increased, thereby deteriorating the inflow efficiency of the cooling wind blowing from the window defined by the window section to the surface of the electro-optic panel. In consequence, problems occur in that the cooling efficiency of the electro-optic device deteriorates, dust or particles readily gather in the effective picture of the window, and a display quality deteriorates.

According to the configuration disclosed in Japanese Patent No. 3583062, it is guessed that the thickness of the above-described window section can be more easily adjusted by adjusting the thickness of the light-shielding plate, compared to a case where the thickness of the window section of the frame is adjusted. However, this configuration also has a problem in that the surface of the electro-optic panel is spaced from the light-shielding plate to be disposed in the frame and thus the stepped portion occurring between the surfaces of the electro-optic panel and the window section is increased, as shown in FIG. 8 of Japanese Patent No. 3583062.

SUMMARY

An advantage of some aspects of the invention is that it provides an electro-optic device capable of improving a cooling efficiency and achieving a high-quality display and an electronic apparatus such as a liquid crystal projector including the electro-optic device.

According to an aspect of the invention, there is provided an electro-optic device including: an electro-optic panel which has a pixel area where a plurality of pixels are disposed; and a mounting case which includes (i) a frame having an opening section for surrounding the circumference of the electro-optic panel, (ii) a first cover member mounted in the frame so as to cover the opening section and defining a first window which corresponds to the pixel area, and (iii) a second cover member mounted in the frame so as to cover the opening section from a side opposite to the first cover member and defining a second window which corresponds to the pixel area. The second cover member has an elastic portion for pressing the electro-optic panel against the first cover member.

In the electro-optic device according to the above aspect of the invention, the electro-optic panel such as the liquid crystal panel is mounted or accommodated in the mounting case. For example, in the liquid crystal panel which is the electro-optic panel, the light in liquid crystal as an electro-optic material, for example, is modulated in accordance with a voltage level applied to the pixel area in pixel unit. When the electro-optic device having the liquid crystal panel is used as a light valve of a liquid crystal projector, for example, a display is achieved by allowing projection light supplied from a light source to be incident on the liquid crystal panel and outputting the light modulated in the liquid crystal as display light.

The mounting case includes the frame, the first cover member, and the second cover member. The frame has the opening section with the frame shape defining an opening for accommodating the electro-optic panel. The electro-optic panel is accommodated in the opening in a state where the electro-optic panel is surrounded by the circumference of the opening section of the frame.

The first and second cover members are mounted in the frame so as to cover the opening defined by the opening section. In the first and second cover members, the first and second windows are defined, respectively, such that light such as projection light contributing to the display is incident on or output from the pixel area. The thickness of a constituent member of the first cover member can be adjusted independently from the frame. The thickness of a wall (hereinafter, referred to as "a window section" for description) defining the first window in the constituent member can be more easily made thin up to a predetermined value.

The second cover member is formed by press-processing, for example, and has the elastic portion in which elasticity occurs upon the mount in the frame, for example. For example, a spring portion is formed as the elastic portion by bending a part of the second cover member made of, for example, a metal material. This elastic portion has elasticity corresponding to the bent shape independent of the elasticity based on the material forming the elastic portion. Accordingly, the elasticity occurs in the elastic portion when the second cover member is mounted in the frame. In addition, a force pushed toward the side opposite the side on which the second cover member is mounted is added to the electro-optic panel accommodated in the mounting case. As a consequence, the electro-optic panel accommodated in the mounting case can be pressed against the first cover and accommodated.

In the electro-optic device according to the above aspect of the invention, it is possible to effectively prevent the electro-optic panel from being spaced far way from the first cover member to be accommodated in the frame, compared to the configuration of the above-described mounting case disclosed in Japanese Patent No. 3583062, for example.

By making the window section of the first cover member thin up to the predetermined value in the electro-optic device according to the above aspect of the invention, it is possible to easily prevent the stepped portion between the surface of the window section and the surface of the electro-optic panel accommodated in the mounting case from being increased due to the thickness of the window section. In addition, it is possible to surely prevent the stepped portion between the surface of the window section and the electro-optic panel from being increased since the first cover member and the electro-optic panel is spaced from each other in the mounting case.

In the electro-optic device according to the above aspect of the invention, the cooling wind supplied from the outside, as described above, can efficiently flow from the first window of the first cover member to the surface of the electro-optic panel. Moreover, by more reliably bringing the electro-optic panel into contact with the first cover member, heat is more efficiently transferred from the electro-optic panel to the first cover member. Moreover, it is possible to more effectively prevent dust, particles, or the like from gathering at the first cover member due to the stepped portion between the window section and the electro-optic panel.

In the electro-optic device described above, it is possible to achieve a high quality display, while further improving the cooling efficiency.

In the electro-optic device according to the above aspect of the invention, the frame may be provided with a protrusion portion protruding from a surface of the first cover member on a side of mounting the first cover member.

According to the above aspect of the invention, when the side of the first cover member is set as the installation surface in the state where the first cover member is mounted in the frame, a force generated upon the installation by the protrusion portion protruding from the surface of the first cover member can be received (in a simple normal example, when the frame mounting the first cover member is put on a table so that the first cover member faces the lower side, the first cover member does not touch the installation surface of the table and can receive a force through the protrusion portion).

Here, in the electro-optic device according to the above aspect of the invention, when the thickness of the constituent member of the first cover member is made thin to make the thickness of the window section the predetermined value, the strength of the first cover member may be reduced. Accordingly, when the first cover member faces the installation surface in the state where the first cover member is mounted in the frame, it is possible to prevent the problem that damage occurs since a relatively strong force is applied to the first cover member and the electro-optic panel accommodated in the frame through the first cover member upon the installation.

When the mounting case is assembled to mount the electro-optic crystal panel in the manufacturing process of the electro-optic device, the electro-optic panel is mounted by setting the first cover member as the installation surface in the state where the first cover member is mounted in the frame. Moreover, even when each process of mounting the second cover member in the frame is performed, the force added to the first cover member can be reduced by allowing the protrusion portion to receive the force in each process, as described above. In consequence, it is possible to improve the yield of a manufacturing process.

In the configuration in which the frame is provided with the protrusion portion, the protrusion portion may also serve as a heat dissipating pin for dissipating the heat of the frame to the outside of the frame.

With such a configuration, compared to a case where the protrusion portion and the heat dissipating pin are separately provided, the size of the frame can be easily reduced by making the area required to dispose the protrusion portion and the heat dissipating pin small. Accordingly, since the mounting case can also be miniaturized, it is possible to contribute to the reduction of the size of the electro-optic device.

In the configuration in which the frame is provided with the protrusion portion, the protrusion portion may also serve as a wind guiding plate for guiding a cooling wind to flow from the outside of the frame to the electro-optic panel through the first window in a state where the electro-optic panel is accommodated in the frame.

With such a configuration, compared to a case where the protrusion portion and the wind guiding plate are separately provided, the size of the frame can be easily reduced by an area required to dispose the protrusion portion and the wind guiding plate in the frame small.

In the electro-optic device according to the above aspect of the invention, the first cover member may have a bent portion bent so as to correspond to the surface shape of a wall forming the opening section.

With such a configuration, since the bent portion corresponds to the surface shape of the wall of the opening section upon mounting the first cover member in the frame, the first cover member and the wall of the opening section can be put together without a gap. Therefore, since this gap does not occur, it is possible to prevent the electro-optic panel from being spaced from the first cover member. Accordingly, it is possible to prevent a stepped portion between the surface of the window section of the first cover member and the electro-optic panel from being increased and efficiently allow the cooling wind to flow from the first window to the electro-optic panel.

The thickness of the first cover member is made thin to adjust the thickness of the window section. As a result, when the strength deteriorates, the first cover member may be deformed since the electro-optic panel is pressed by the elasticity of the second cover member in the mounting case and a force is added to the first cover member. According to the above configuration, however, since the first cover member and the wall of the opening section of the frame are put together without a gap by the bent portion to be mounted in the frame, it is possible to effectively prevent the first cover member from being deformed due to the added force.

In the configuration in which the first cover member has the bent portion, the bent portion may have a concave portion which is partially notched, and a heat dissipating pin for dissipating the heat of the frame to the outside of the frame may be formed in the frame to correspond to the concave portion.

With such a configuration, by disposing the heat dissipating pin to the concave portion, which may deteriorate in the strength since a part of the bent portion is void in the first cover member, so that the heat dissipating pin corresponds to the frame, the strength in the concave portion can be reinforced in the state where the first cover member is mounted in the frame. Accordingly, it is possible to prevent the first cover member from being deformed in the concave portion due to the force added to the first cover member when the electro-optic panel is pressed by the elasticity of the second cover member in the mounting case. In addition, compared to a case where the frame is provided with a member for reinforcing the concave portion is provided separately from the heat dissipating pin, as described above, the size of the frame can be easily reduced by making an area required to dispose the member and the heat dissipating pin in the frame small.

Here, when the first cover members are manufactured using a sequential sending manufacture equipment, it is possible to easily manufacture the first cover members by providing the concave portions in parts of the bent portions and by continuously connecting the several first cover members to the concave portions (the related manufacture is described below with reference to the drawings).

In the configuration in which the first cover member has the bent portion, the bent portion may have a concave portion which is partially notched, and the frame may be provided with a wind guiding plate for guiding a cooling wind to flow from the outside of the frame to the electro-optic panel through the first window in a state where the electro-optic panel is accommodated in the frame to correspond to the concave portion.

With such a configuration, by disposing the wind guiding plate to the concave portion, which may deteriorate in the strength since a part of the bent portion is void in the first cover member, to correspond to the frame, the strength in the concave portion can be reinforced in the state where the first cover member is mounted in the frame. In addition, compared to a case where the frame is provided with a member for reinforcing the concave portion is provided separately from the wind guiding plate, as described above, the size of the frame can be easily reduced by making an area required to dispose the member and the wind guiding plate in the frame small.

In the electro-optic device according to the above aspect of the invention, the first cover member may have a bent portion bent so as to correspond to the surface shape of a wall forming the opening section. The frame may be provided with a protrusion portion protruding from a surface of the first cover member on a side of mounting the first cover member. The bent portion may have a concave portion which is partially notched and the protrusion portion is formed to correspond to the concave portion.

According to the aspect of the invention, when the first cover member is set as the installation surface in the state where the first cover member is mounted in the frame, a force added to the installation surface upon the installation may occur due to the protrusion portion protruding from the surface of the first cover member. In addition, when the first cover member is mounted in the frame, the first cover member and the wall of the opening section cannot be put together without a gap since the bent portion corresponds to the surface shape of the wall of the opening section.

Here, by disposing the protrusion portion to the concave portion, which may deteriorate in the strength since a part of the bent portion is void in the first cover member, to correspond to the frame, the strength in the concave portion can be reinforced in the state where the first cover member is mounted in the frame. In addition, compared to a case where the frame is provided with a member for reinforcing the concave portion is provided separately from the protrusion portion, as described above, the size of the frame can be easily reduced by making an area required to dispose the member and the protrusion portion in the frame small.

In the above-described configuration in which the first cover member has the bent portion, the first cover member may have a groove portion formed along the bent portion and the bottom of the groove portion protrudes from the surface of the first cover member facing the opening section.

With such a configuration, by allowing the groove portion protruding in a concave shape from the surface on a side of the first cover member facing the opening section of the frame to serve as a stopper, location mismatch is prevented from occurring in the bent portion and the opening section of the frame. Therefore, the first cover member and the wall of the opening section can be more reliably put together without a gap. Accordingly, it is possible to more reliably prevent the first cover member from being deformed due to the force added to the first cover member when the electro-optic panel is pressed by the elasticity of the second cover member in the mounting case.

In the first cover member, it is preferable that the groove portion is formed by so-called half punching or half cutting. In this case, the about half of the thickness of the constituent member of the first cover member is removed. Accordingly, even when the groove portion comes in contact with the electro-optic panel, for example, in the mounting case, it is possible to prevent a space between the first cover member and the electro-optic panel from being considerable.

In the electro-optic device according to the above aspect of the invention, the first cover member may be provided with a mounting portion for mounting the first cover member in the frame and the frame is provided with a claw portion for hooking the mounting portion for the mounting. The mounting portion may have a hook portion formed so as to be hooked on a wall provided with the claw portion of the frame in a state where the mounting portion is mounted in the frame. The wall provided with the claw portion of the frame may be provided with a fixing portion for fixing the hook portion upon hooking the hook portion.

According to the aspect of the invention, the first cover member is mounted in the frame by hooking the claw portion of the frame on the mounting portion. Accordingly, since a force dragged toward the mounting portion hooked on the claw portion is generated in the first cover member, deformation may occur.

According to the aspect of the invention, the hook portion is fixed to the fixing portion by the force generated when the mounting portion is dragged by the claw portion in the state where the mounting portion is mounted on the claw portion. Accordingly, the force generated when the mounting portion is dragged by the hook portion can be reduced. As a result, it is possible to prevent the first cover member from being deformed when the mounting portion is mounted on the claw portion.

In the electro-optic device according to the above aspect of the invention, the electro-optic device may have a light-shielding film formed in a frame shape in the periphery of the pixel area and the surface of the mounting case on a light incident side may be at least partially formed of a material having light reflectance lower than that of the light-shielding film.

According to the aspect, the area of the effective picture displayed by light emitted from the pixel area is defined by the light-shielding film having the frame shape in the electro-optic panel. For example, since projection light in a projector can be incident on the pixel area in the electro-optic panel, light traveling toward the periphery outside the image area is shielded by the light-shielding film having the frame shape. In addition, light traveling toward the outside of the pixel area in the electro-optic panel is also shielded in the first cover member disposed on the light incident side of the mounting case and the surface of the frame (it is preferable that the first cover member of the mounting case is disposed on the light incident side, as described in a embodiment described below).

According to the aspect of the invention, the surface on the light incident side in the mounting case is at least partially formed of the material having light reflectance lower than that of the light-shielding film within the electro-optic panel. When the first cover member is disposed on the light incident side of the mounting case, as described above, the surface facing the light incident side in at least one of the frame and the first cover member is at least partially formed of the material having light reflectance lower than that of the light-shielding film within the electro-optic panel. As for the surface on the light incident side of the mounting case, it is more difficult for light to be reflected from at least a part of the surface of at least one of the frame and the first cover member than from the light-shielding film within the electro-optic panel. Accordingly, in the surface on the light incident side of the mounting case, it is possible to restrain the reflection of light which does not contribute to the display since the light travels toward the periphery outside the pixel area. Thus, it is possible to restrain stray light generated when the light reflected from the surface on the light incident side of the mounting case is again reflected from a member (for example, a member supporting a polarizing plate) disposed on the light incident side. As a consequence, it is possible to more effectively prevent a problem that a large amount of stray light is mixed with display light emitted from the image pixel area.

In the configuration in which the surface of the mounting case is formed so as to have the light reflectance lower than that of the light-shielding film, the surface of the first cover member on the light incident side may be at least partially formed of a material having light reflectance higher than that of the frame.

With such a configuration, in the surface of the mounting case on the light incident side, the light which does not contribute to a display since the light travels toward the periphery outside the pixel area can be greatly reflected from the first cover member facing a side which is broader and on which the light of the liquid crystal device is incident. Accordingly, it is possible to more efficiently prevent the temperature of the electro-optic panel from being increased due to the high degree of light incident on the electro-optic panel.

According to another aspect of the invention, there is provided an electronic apparatus including the above-described electro-optic device.

According to the electronic apparatus according to this aspect of the invention, various electronic apparatuses can be embodied, such as a projection type display apparatus capable of achieving a high quality display while improving a cooling efficiency, a television, a portable telephone, an electronic pocket book, a word processor, a view finder type or monitor direct view-type video tape recorder, a workstation, a television phone, a POS terminal, and a touch panel. In addition, an electrophoresis apparatus such as an electronic paper may be realized.

The operations and other advantages of the aspects of the invention are apparent from an exemplary embodiment described below.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereinafter, an electro-optic device according to an exemplary embodiment of the invention will be described with reference to the drawings. In the embodiment described below, a TFT (Thin Film Transistor) active matrix driving mode liquid crystal device will be described as the electro-optical device of the invention.

Figure 1:
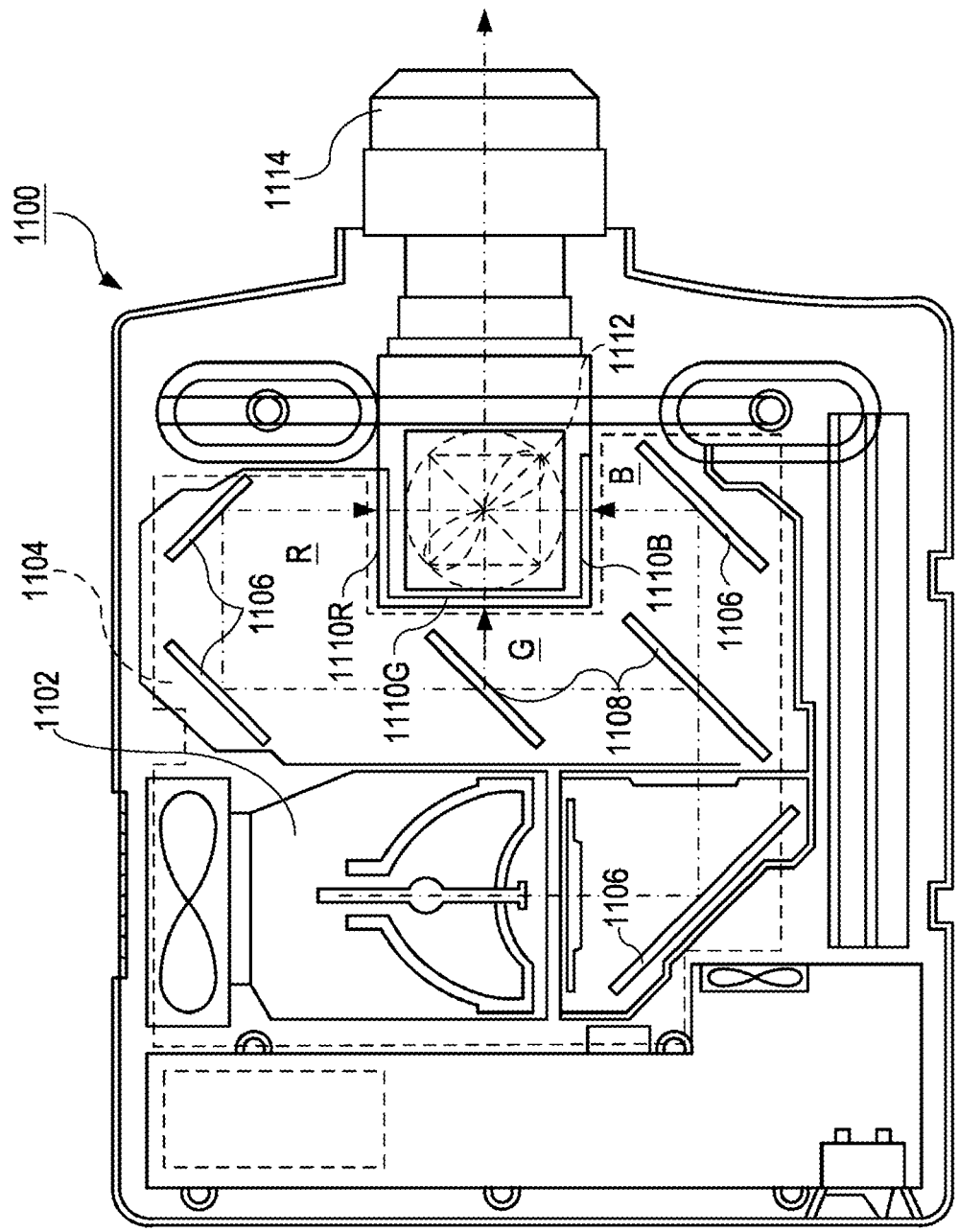
FIG. 1 is a top view illustrating the configuration of a projector as an example of an electronic apparatus to which a liquid crystal device is applied.

First, a liquid crystal projector (hereinafter, simply referred to as "a projector") as an example of an electronic apparatus in which the liquid crystal device is applied as a light valve will be described. FIG. 1 is a top view illustrating the configuration of the projector.

In FIG. 1, a projector 1100 is configured as a multi-plate type color projector using three liquid crystal light valves 1100R, 1100G, and 1100B for RGB.

As shown in FIG. 1, a lamp unit 1102 including a white light source such as a halogen lamp is provided inside the projector 1100. Projection light output from the lamp unit 1102 is divided into the three primary colors of RGB by four mirrors 1106 and two dichroic mirrors 1108 disposed in a light guide 1104, and the projection light is incident on light valves 1110R, 1110B, and 1110G corresponding to the primary colors, respectively.

The liquid crystal device including the light valves 1110R, 1110B, and 1110G is driven by R, G, and B primary color signals supplied from an image signal processing circuit (the details are described below). Light modulated by the light values of the liquid crystal device is incident from three directions on a dichroic prism 1112. In the dichroic prism 1112, R light and B light are refracted at 90 degrees and G light travels straight. Accordingly, images of the respective colors are combined to project a color image through a projection lens 1114 on a screen.

Even though not shown in FIG. 1, a cooling wind supplying unit such as a sirocco fan is provided to prevent an excessive increase in the temperature of the light valves 1110R, 1110B, and 1110G caused by a relatively strong projection light.

Next, the overall configuration of the liquid crystal device according to this embodiment will be described with reference to FIGS. 2 to 15. In the following drawings, layers and elements of the drawings are appropriately shown with different scales to allow the layers and the elements to be recognizable in the drawings.

Figure 2:
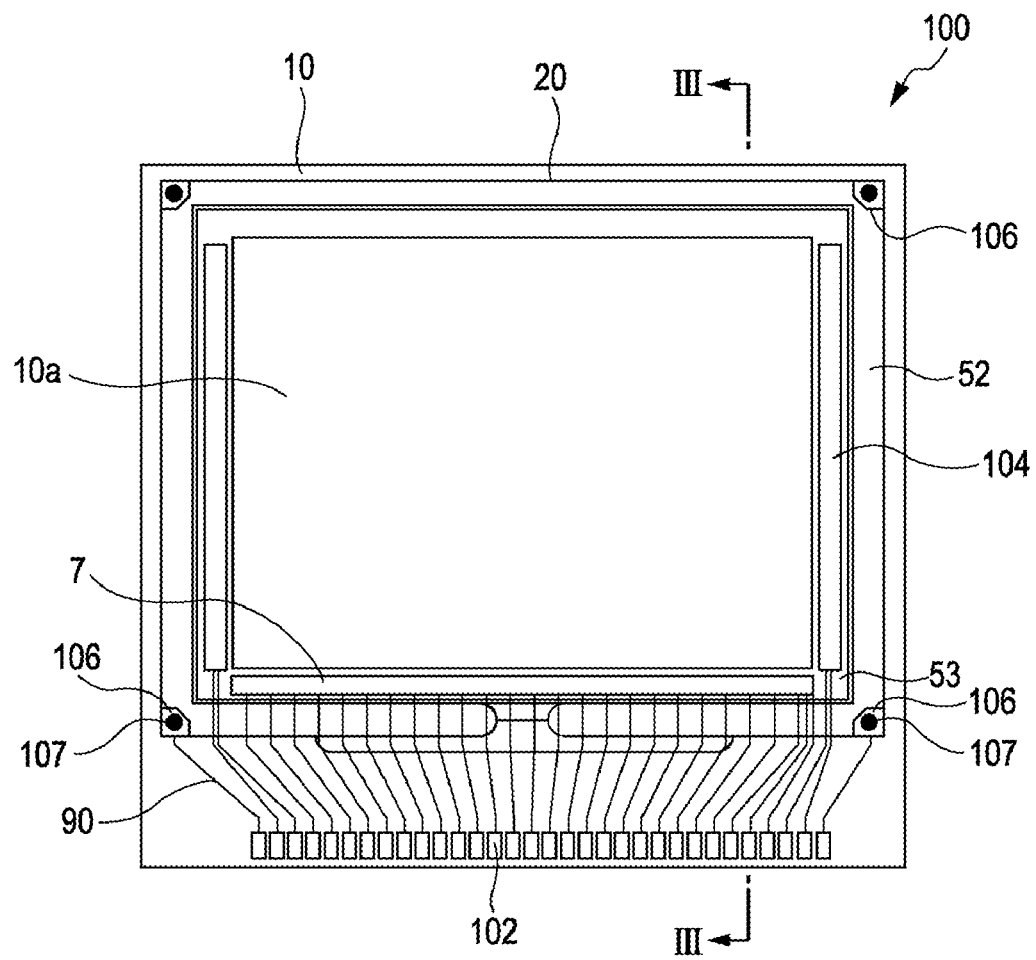
FIG. 2 is a top view illustrating the overall configuration of the liquid crystal device.
Figure 3:
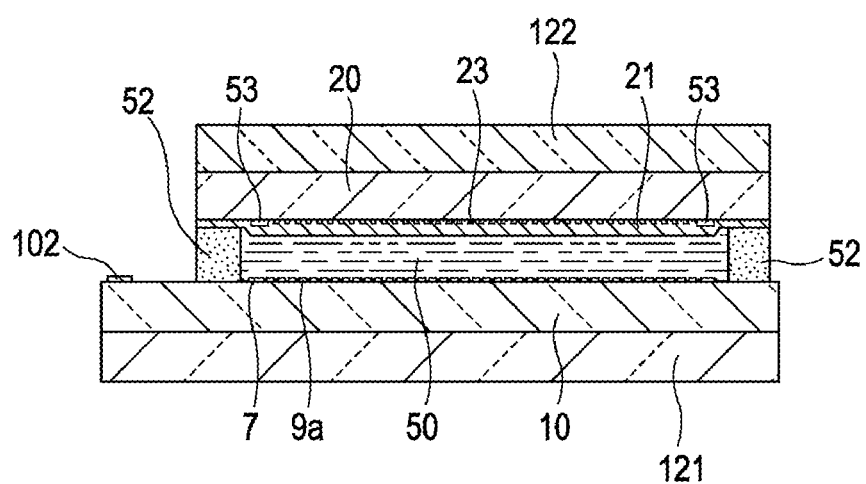
FIG. 3 is a sectional view taken along the line III-III of FIG. 2.

First, the configuration of the liquid crystal panel provided in the liquid crystal device will be described with reference to FIGS. 2 and 3. FIG. 2 is a top view illustrating the overall configuration of the liquid crystal panel according to this embodiment. FIG. 3 is a sectional view taken along the line III-III of FIG. 2.

In FIGS. 2 and 3, a liquid crystal panel 100 according to this embodiment includes a TFT array substrate 10 and a counter substrate 20 facing each other. A liquid crystal layer 50 is sealed between the TFT array substrate 10 and the counter substrate 20. The TFT array substrate 10 and the counter substrate 20 are attached to each other by a sealing member 52 provided in a sealing area located round an image display area 10a as an example of "a pixel area" according to the invention. The sealing member 52 formed of an ultraviolet curable resin for joining both the substrates is cured by ultraviolet radiation after the sealing member is applied onto the TFT array substrate 10. In the sealing member 52, gap members (not shown) such as fiberglass or glass bead for maintaining a predetermined gap (a gap between the substrates) between the TFT array substrate 10 and the counter substrate 20 are dispersed.

In FIG. 2, the counter substrate 20 is provided with a frame light-shielding film 53 which has a light-shielding property, is parallel to the inside of the sealing area provided with the sealing member 52, and defines the frame area of an image display area 10a. In an area located outside the sealing area provided with the sealing member 52 in the peripheral area, external circuit connection terminals 102 including an image signal terminal supplying an image signal are disposed along one side of the TFT array substrate 10. A sampling circuit 7 formed along the one side is provided further inside than the sealing area so as to be covered with the frame light-shielding film 53. Scanning line driving circuits 104 are respectively disposed inside the sealing area along two sides adjacent the one side so as to be covered with the frame light-shielding film 53. On the TFT array substrate 10, vertical conductive terminals 106 connecting both the substrates through vertical conductive members 107 are disposed in areas facing the four corners of the counter substrate 20. The vertical conductive terminals 106 and the vertical conductive members 107 enable electric connection between the TFT array substrate 10 and the counter substrate 20.

On the TFT array substrate 10, an external circuit connection terminal 102, the sampling circuit 7, the scanning line driving circuits 104, and drawn wiring lines 90 electrically connecting the vertical conductive terminals 106 or the like are formed.

In FIG. 3, a laminated structure including pixel switching TFTs and wiring lines such as scanning lines and data lines is formed on the TFT array substrate 10. Even though the detailed description of the laminated structure is not shown, pixel electrodes 9a are provided on the pixel switching TFTs and the wiring lines such as the scanning lines and the data lines in the image display area 10a. The pixel electrode 9a is typically made of a transparent material such as ITO (Indium Tin Oxide) and formed in an island shape in a predetermined pattern in each of pixels.

An alignment film (not shown) is formed on the pixel electrodes 9a. On the other hand, a light-shielding film 23 is formed on the surface of the counter substrate 20 facing the TFT array substrate 10. On the light-shielding film 23, a counter electrode 21 made of a transparent material such as ITO is formed to face the plurality of pixel electrodes 9a. An alignment film (not shown) is formed on the counter electrode 21. The liquid crystal layer 50 formed of liquid crystal mixed with one or various kinds of nematic liquid crystal, for example, takes a predetermined alignment state between the pair of alignment films.

When the liquid crystal panel 100 is driven, an image signal is supplied to the pixel electrode 9a in each of pixels to be stored between the pixel electrode 9a and the counter electrode 21 for certain time. The liquid crystal contained in the liquid crystal layer 50 achieves a gray scale display by varying the alignment or order of a molecule collection and modulating light by an applied voltage level. In a normally-white mode, transmissivity of incident light is decreased in accordance with a voltage to be applied in unit of each pixel. In a normally-black mode, the transmissivity of incident light is increased in accordance with the voltage to be applied in unit of each pixel. As a whole, light having contrast according to an image signal in the image display area 10a is output. Even though detailed description is omitted, the pixels are driven by supplying various signals such as the image signal to the data lines or the scanning lines and the pixel electrodes 9a are switching-controlled by the pixel switching TFTs.

In FIG. 3, dust-proof substrates 121 and 122 formed of a transparent substrate such as glass are respectively provided on sides of the TFT array substrate 10 and the counter substrate 20 which do not face the liquid crystal layer 50. Dust or particles attached to an external surface of the TFT array substrate 10 and the counter substrate 20, that is, the joining surfaces of the dust-proof substrates 121 and 122 joined to each other are shown in an out-of-focus state on a display area of the screen described with reference to FIG. 1 by a defocus operation of the dust-proof substrates 121 and 122. Accordingly, it is possible to prevent the above-described dust or particles from being clearly shown on the display area of the screen. An optical element such as reflection preventing plate may be provided in the liquid crystal panel 100 as well as the dust-proof substrates 121 and 122, even though not shown.

Here, even though not shown, an inspecting circuit or an inspecting pattern for inspecting the quality or defect of the liquid crystal device during manufacture or in shipment may be provided on the TFT array substrate 10 as well as the sampling circuit 7 and the scanning line driving circuits 104.

In the liquid crystal device according to this embodiment, the above-described liquid crystal panel 100 is accommodated within a mounting case. Hereinafter, the configuration of the liquid crystal device will be described with reference to FIGS. 4 to 16.

Figure 4:
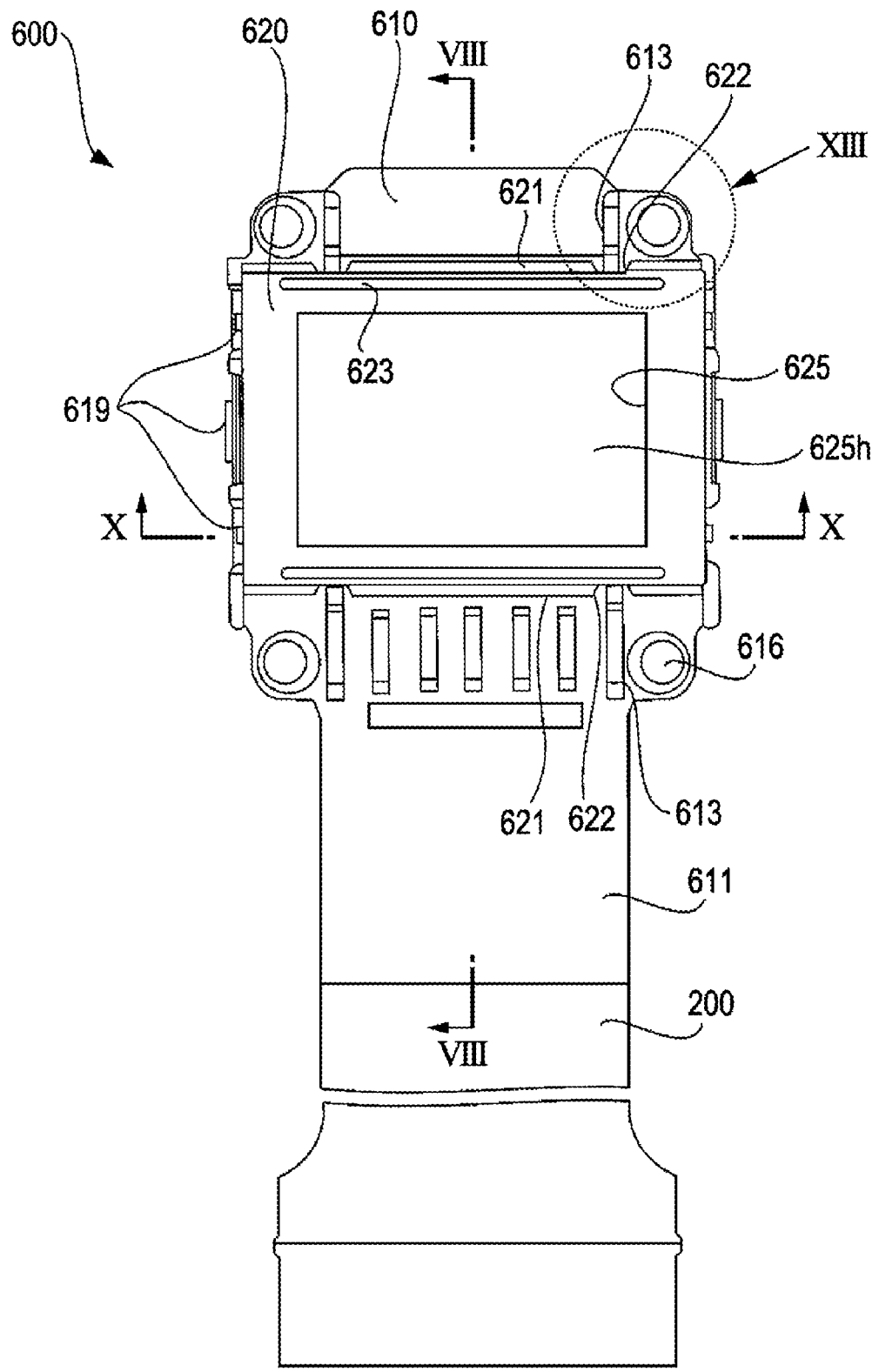
FIG. 4 is a top view illustrating the liquid crystal device viewed from a light incident side.
Figure 5:
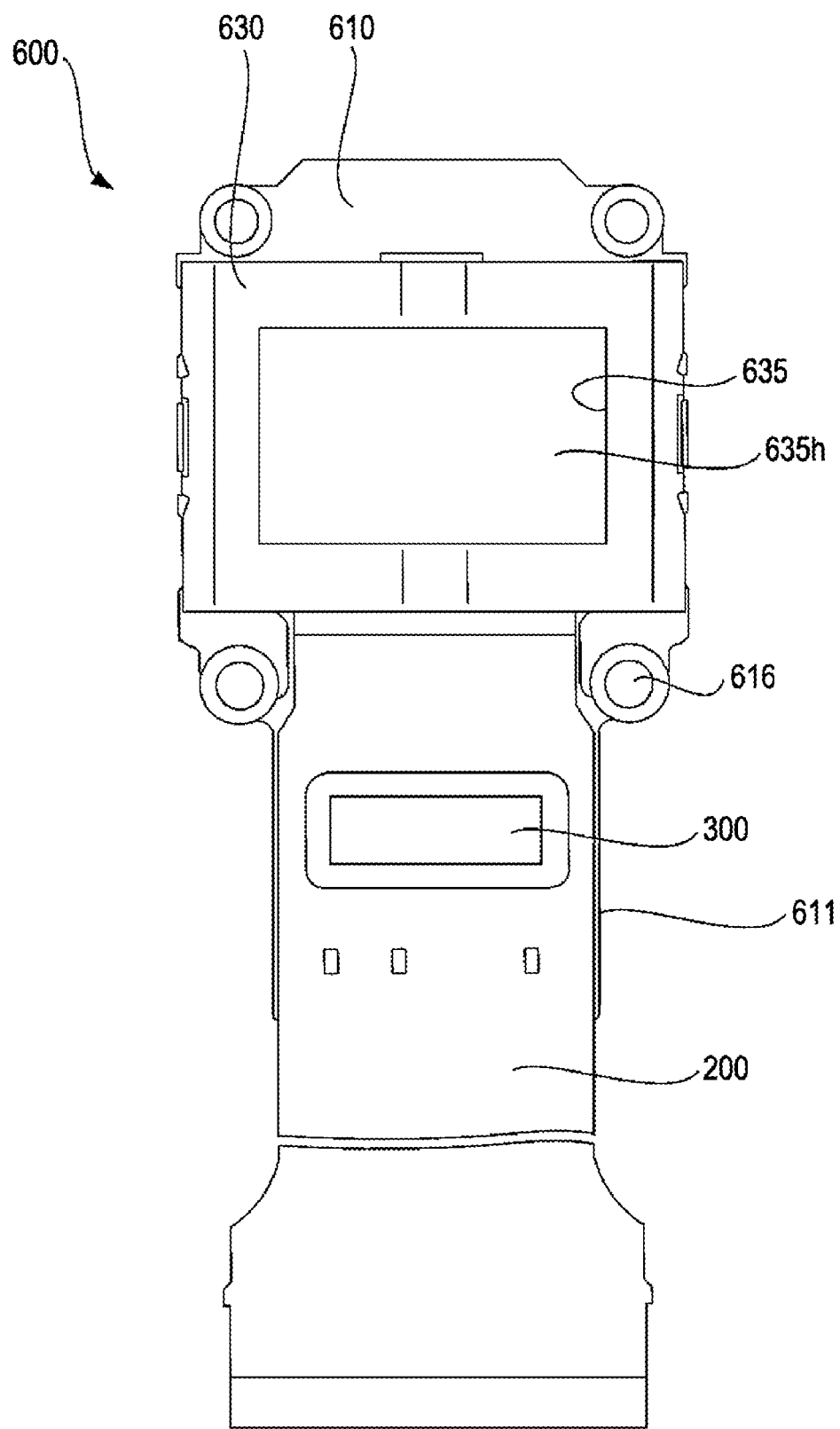
FIG. 5 is a top view illustrating the liquid crystal device viewed from a light output side.
Figure 6:
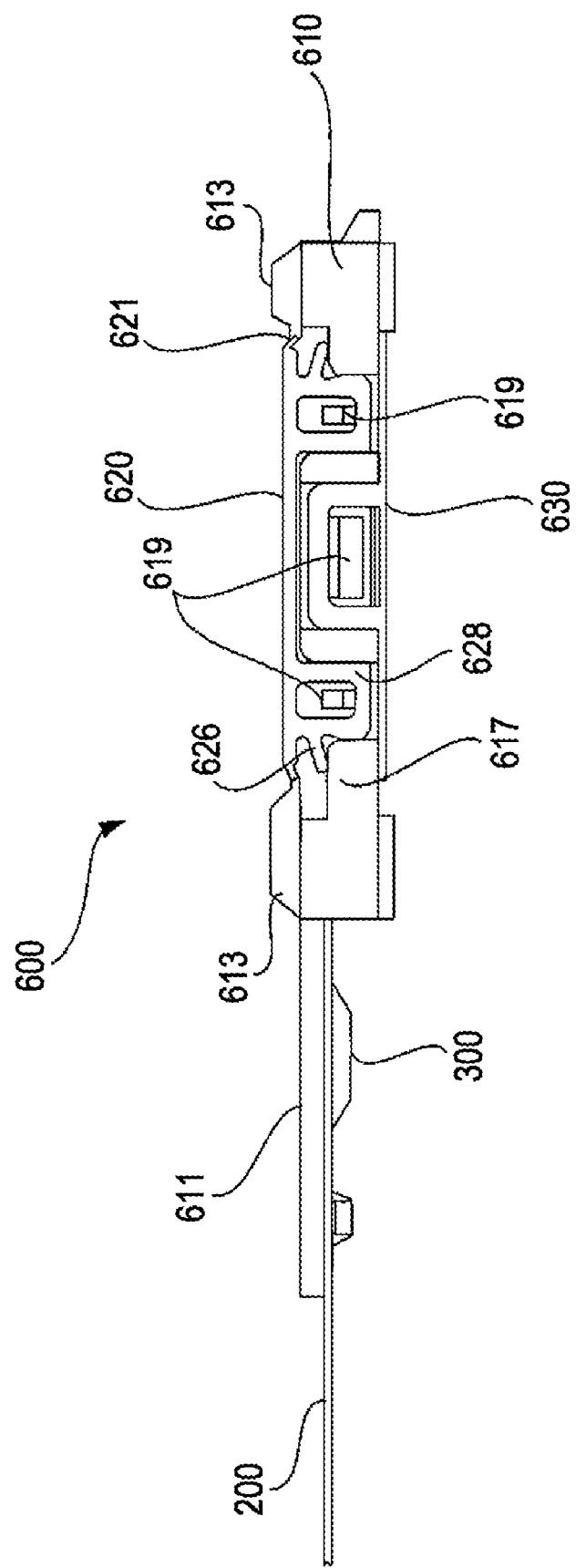
FIG. 6 is a side view illustrating a mounting case of the liquid crystal device viewed from a side surface.
Figure 7:
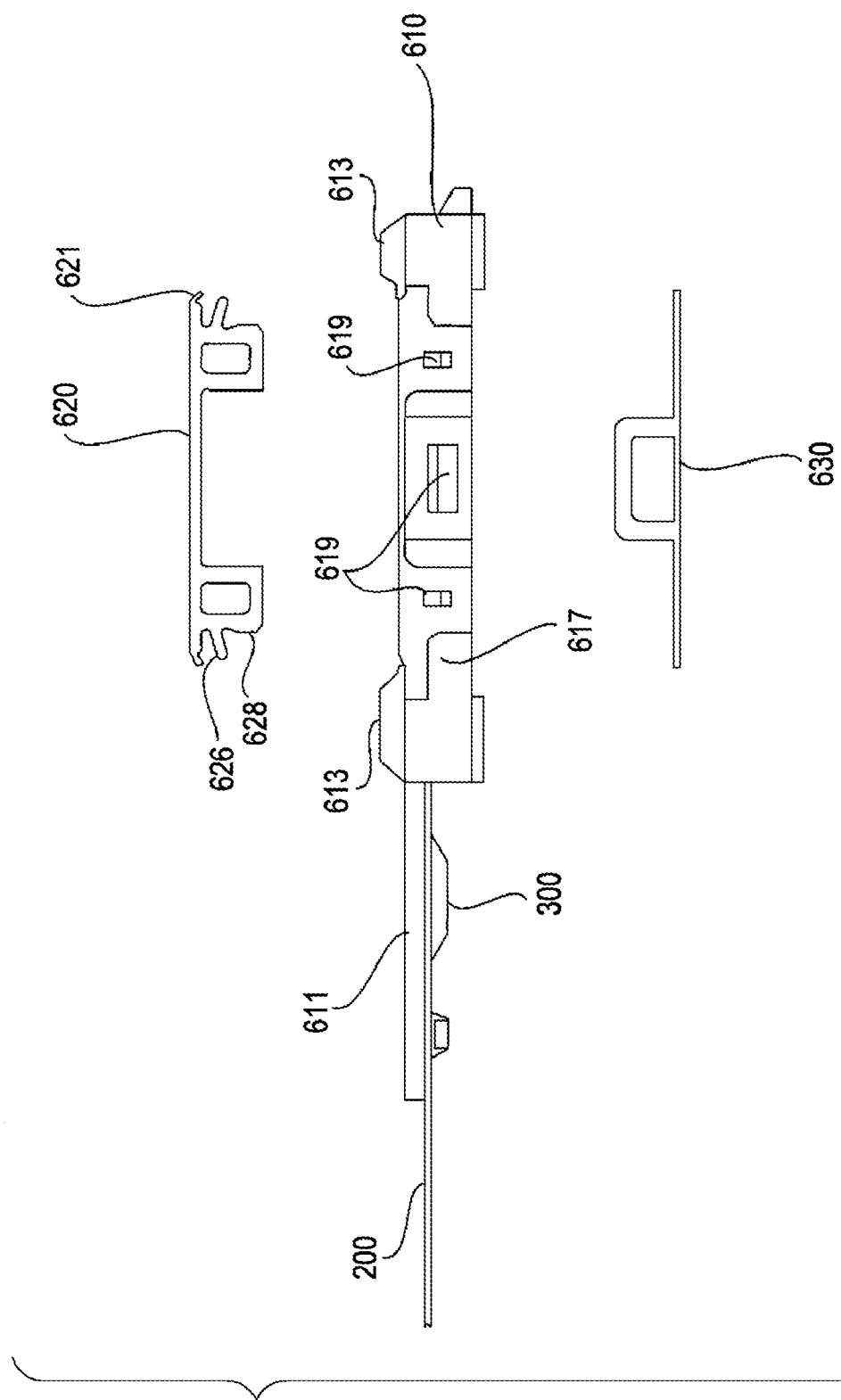
FIG. 7 is an exploded side view illustrating exploded major constituent elements of the mounting case in the liquid crystal device shown in FIG. 6.

FIG. 4 is a top view illustrating the liquid crystal device viewed from a light incident side. FIG. 5 is a top view illustrating the liquid crystal device viewed from a light output side. FIG. 6 is a side view illustrating the mounting case of the liquid crystal device viewed from a side surface. FIG. 7 is an exploded side view illustrating exploded major constituent elements of the mounting case of the liquid crystal device shown in FIG. 6.

In FIGS. 5 to 7, a mounting case 600 accommodating the liquid crystal panel 100 includes a frame 610, a first hook 620, and a second hook 630. The first hook 620 is an example of "a first cover member" according to the invention and the second hook 630 is an example of "a second cover member" according to the invention. The frame 610 is formed of metal such as aluminum by die-casting (metal mold casting), for example. The first hook 620 and the second hook 630 are formed of metal such as aluminum or stainless steel by press-processing, for example.

In FIGS. 5 to 7, a circuit section, which is associated with supply of an image signal, including a data line driving circuit or an image signal supplying circuit supplying an image signal to the pixels through the sampling circuit 7 in the liquid crystal panel 100 is preferably included in a driving IC (Integrated Circuit) chip 300. Alternatively, a part of the circuit section associated with the supply of the image signal may be included in the driving IC chip 300 and other sections may be included on the TFT array substrate 10.

Figure 8:
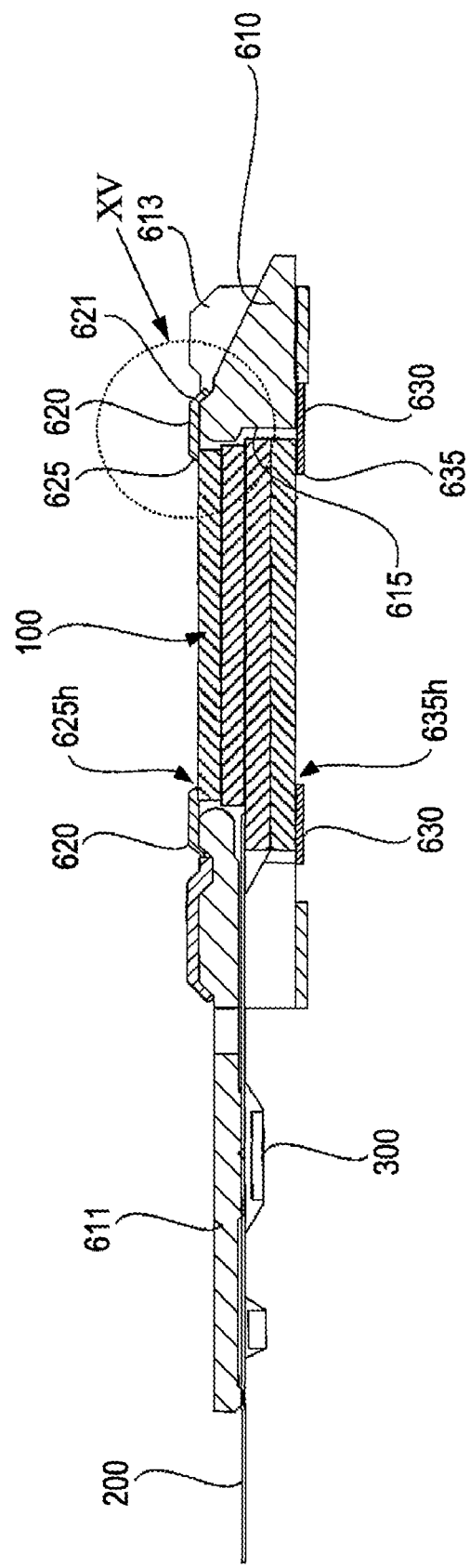
FIG. 8 is a sectional view illustrating the configuration of the cross-section of the liquid crystal device taken along the line VIII-VIII of FIG. 4.
Figure 10:
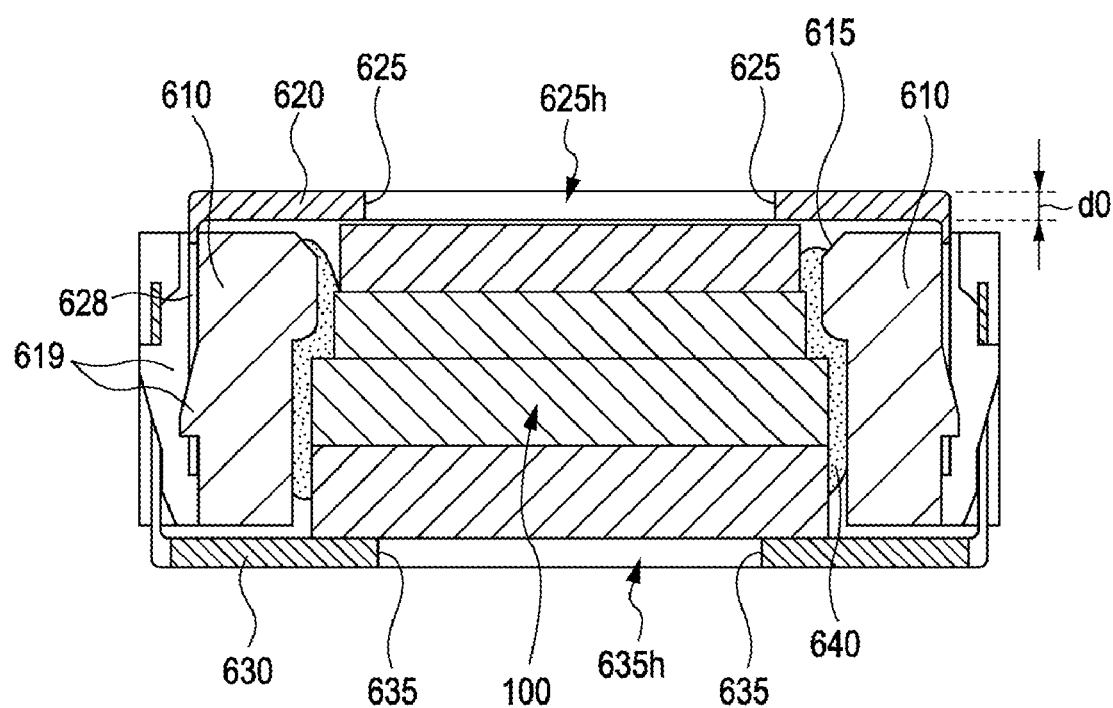
FIG. 10 is a sectional view illustrating the configuration of the cross-section of the liquid crystal device taken along the line X-X of FIG. 4.

FIG. 8 is a sectional view illustrating the configuration of the cross-section of the liquid crystal device taken along the line VIII-VIII shown in FIG. 4. FIG. 10 is a sectional view illustrating the cross-section of the liquid crystal device taken along the line X-X shown in FIG. 4.

In FIG. 8, the liquid crystal panel 100 is electrically connected to the driving IC chip 300 via a wiring substrate 200 in the external circuit connection terminal 102. The driving IC chip 300 is fixed and attached to the wiring substrate 200 by a TAB (Tape Automated Bonding) technique, for example. Various circuits which supply the liquid crystal panel 100 with various signals including the image signal are embedded in the driving IC chip 300. That is, the display operation described with reference to FIGS. 2 and 3 is performed by driving the liquid crystal panel 100 by the driving IC chip 300 in addition to the scanning line driving circuit 104 and the sampling circuit 7 formed on the TFT array substrate 10.

The configurations of the frame 610, the first hook 620, and the second hook 630 of the mounting case 600 will be described in more detail. In this embodiment, as described with reference to FIG. 1, it is assumed that in the projector 1100, the projection light is incident from the side of the first hook 620, transits through the image display area 10a of the liquid crystal panel 100, and is then output from the side of the second hook 630. That is, referring to FIG. 1, the element facing the dichroic prism 1112 is not the first hook 620 but the second hook 630.

As shown in FIGS. 8 and 10, a constituent member of the frame 610 is cut out to accommodate the liquid crystal panel 100 and an opening section 615 defines an opening corresponding to the cut-out portion. The liquid crystal panel 100 is surrounded by the opening section 615 from the circumference thereof in the frame 610 and accommodated in the opening.

Figure 11:
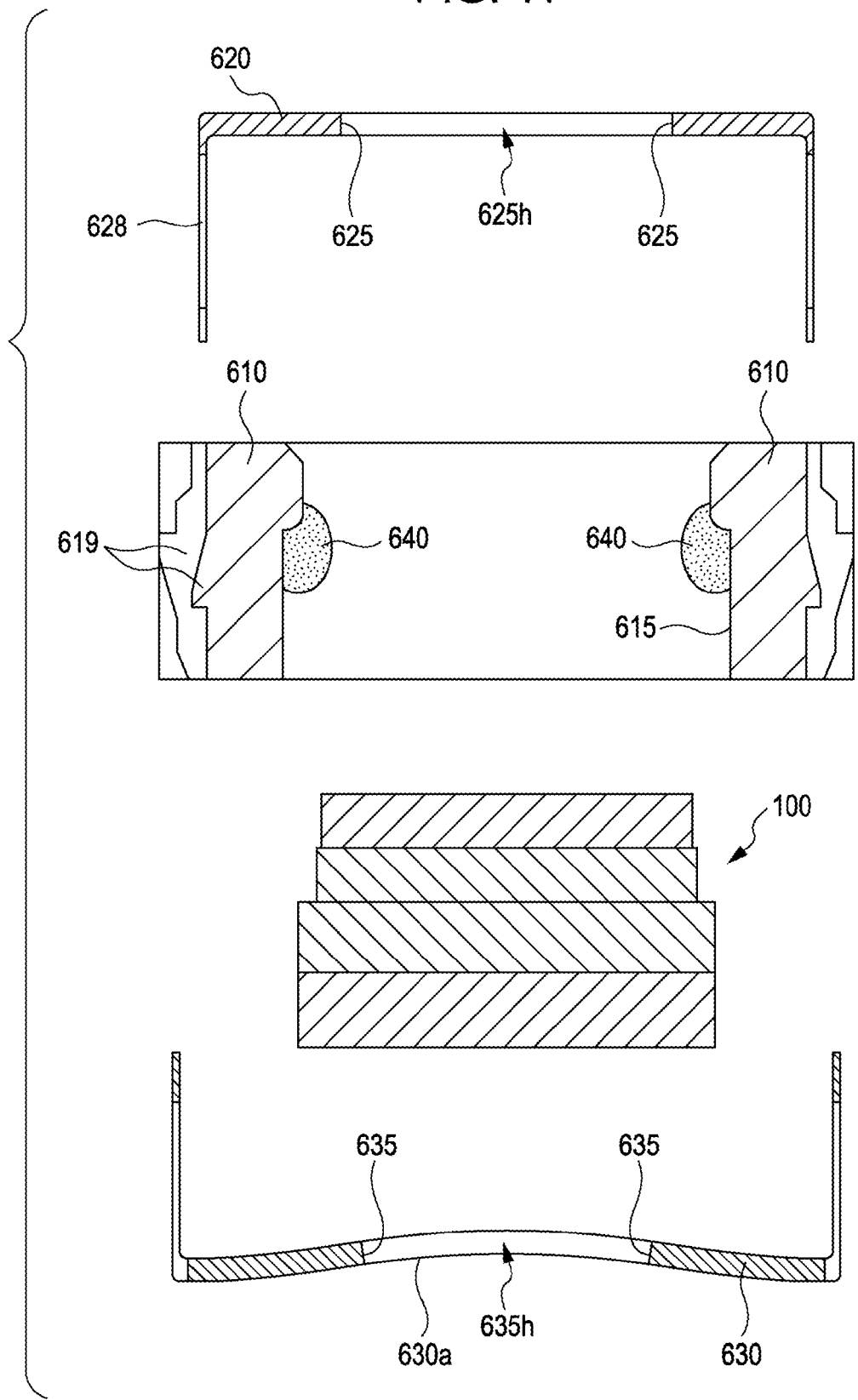
FIG. 11 is an exploded sectional view illustrating the exploded major constituent elements of the mounting case in the liquid crystal device shown in FIG. 10.

FIG. 11 is an exploded sectional view illustrating the exploded major constituent elements of the mounting case in the liquid crystal device shown in FIG. 10. In FIG. 10, the first hook 620 and the second hook 630 functioning as a so-called cover are mounted on the frame 610 having the coverless box-like shape, as described above. That is, the opening defined by the opening section 615 in the frame 610 is in a closed state by mounting the first hook 620 and the second hook 630 from the opposite sides.

The first hook 620 as a plate-shaped member is mounted on the frame 610 to cover the opening section 615 so as to face one surface of the liquid crystal panel 100 in the mounting case 600, as shown in FIGS. 4, 6, 7, and 10. In this state, the liquid crystal panel 100 is placed on the first hook 620 to be accommodated in the frame 610.

The first hook 620 has a window section 625 defining a first window 625h which is a part of a constituent member of the first hook formed in an opening shape. It is preferable that the window section 625 comes in direct contact with the liquid crystal panel 100 in the state where the first hook 620 is mounted on the frame 610. The window section 625 defines the first window 625h in correspondence with the image display area 10a of the liquid crystal panel 100. The projection light emitted in the projector 1100 shown in FIG. 1 is incident on the image display area 10a of the liquid crystal panel 100 from the first window 625h. That is, the peripheral area of the image display area 10a of the liquid crystal panel 100 comes in contact with the window section 625. Since the liquid crystal panel 100 comes in contact with the circumference of the window section 625, heat is transferred from the former to the latter without interruption.

The second hook 630 is mounted on the frame 610 from the side opposite to the first hook 620 to cover the opening section 615 so as to face the other surface of the liquid crystal panel 100, as shown in FIGS. 5, 6, 7, and 10. In this embodiment, as shown in FIG. 11, the second hook 630 has a spring portion 630a as an example of "an elastic portion" according to the invention, where elasticity occurs at the time of mounting the second hook 630 on the frame 610. The spring portion 630a is formed by bending a part of the second hook 630 made of a metal material, for example, and has the elasticity corresponding to the bent shape.

In FIG. 11, when the mounting case 600 is assembled upon the manufacture of the liquid crystal device, the first hook 620 is mounted on the frame 610, the liquid crystal panel 100 is accommodated in the frame 610, and then the liquid crystal panel 100 is adhered to the opening section 615 from the circumference thereof by an adhesive 640. Thereafter, the second hook 630 is mounted on the frame 610. When the second hook 630 is mounted on the frame 610, the elasticity occurs in the spring portion 630a. Therefore, a force pushing the liquid crystal panel 100 accommodated in the frame 610 toward the side opposite to the side of mounting the second hook 630 is added. In this way, it is possible to accommodate the liquid crystal panel 100 in the frame 610 by the elasticity occurring in the spring portion 630a in the state where the liquid crystal panel 100 is pressed by the first hook 620. As a result, in comparison to Japanese Patent No. 3583062 described above, for example, it is possible to effectively prevent the liquid crystal panel 100 from being spaced far away from the first hook 620 upon mounting the liquid crystal panel 100 in the frame 610.

Like the first hook 620, the second hook 630 has a window section 635 defining a second window 635h and it is preferable that the second hook 630 comes in contact with the liquid crystal panel 100 in the window section 635. In the projector 1100 shown in FIG. 1, the projection light transmitted through the image display area 10a of the liquid crystal panel 100 is output from the second window 635h of the second hook 630. Like the first hook 620, since the liquid crystal panel 100 comes in contact with the circumference of the window section 635 of the second hook 630, heat is transferred from the former to the latter without interruption.

Figure 12:
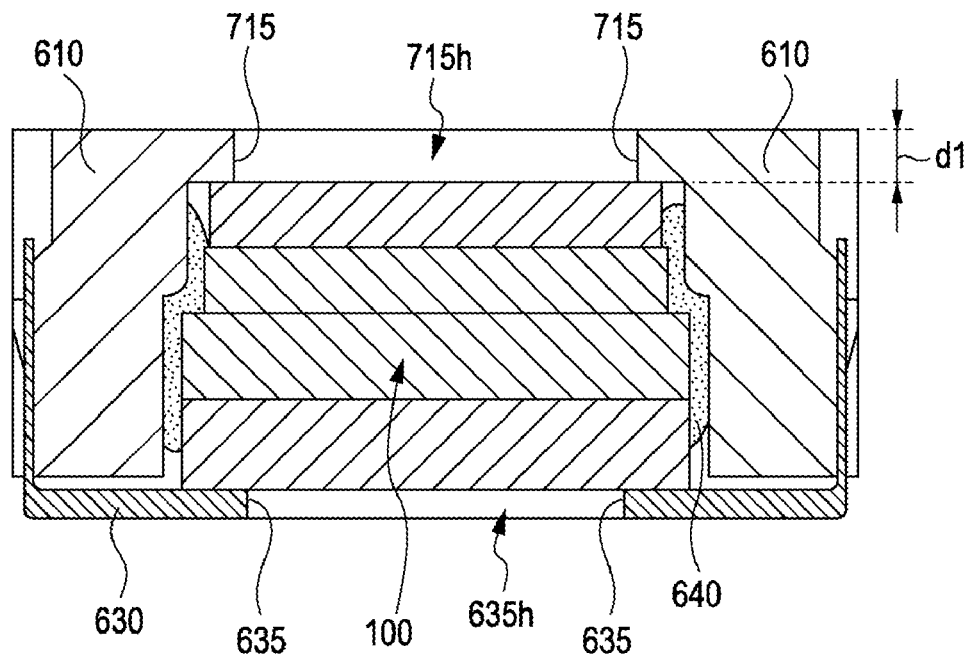
FIG. 12 is a sectional view illustrating the cross-section corresponding to that of FIG. 10 in a liquid crystal device according to a comparative example of the embodiment.

FIG. 12 is a sectional view illustrating the configuration of the cross-section corresponding to that of FIG. 10 in a liquid crystal device according to a comparative example of the embodiment. Description mainly focuses on the difference in configuration to that of this and the description of the other configuration is omitted.

In the comparative example shown in FIG. 12, a window section 715 coming in contact with the circumferential area on one surface of the liquid crystal panel 100 is formed by a part of a constituent member of the frame 610. When a hook 630 is mounted on the frame 610, a side facing the window section 715 in the frame 610 enters a closed state. Accordingly, according to the comparative example, projection light emitted in the projector 1100 shown in FIG. 1 is incident on the image display area 10a of the liquid crystal panel 100 from a window 715h defined by the window section 715.

In this case, in a manufacturing process, it is difficult to make only a thickness dl of the window section 715 thin up to a predetermined value in the constituent member of the frame 610. As a result, a stepped portion occurring between the surface of the window section 715 and the surface of the liquid crystal panel 100 may be increased.

In this embodiment, however, it is possible to adjust the thickness of the constituent member of the first hook 620 independently from the frame 610, as shown in FIG. 10. For example, by performing press-processing on the member included in the first hook 620 upon the manufacture of the liquid crystal device, it is possible to easily adjust the thickness of the member. In this way, a thickness d0 of the window section 625 can be easily made thin up the predetermined value. For example, the thickness d1 of the window section 715 in FIG. 12 is about 0.4 mm to about 0.7 mm. However, the thickness d0 of the window section 625 in FIG. 10 can be made thin up to about 0.1 mm to about 0.2 mm. Accordingly, by preventing an increase in the thickness of the mounting case 600 and decreasing the size of the liquid crystal device, it is possible to decrease the size of the projector 1100 shown in FIG. 1.

By forming the first hook 620 with a metal material such as stainless steel, it is possible to perform press-processing more easily. Moreover, it is possible to improve reflectance of the first hook 620 more than the reflectance of the surface of the opening section 615 of the frame 610. In this way, since light traveling toward the circumference area of the liquid crystal panel 100 is reflected from the first hook 620, a considerable increase in the temperature of the liquid crystal device can be prevented.

Figure 9:
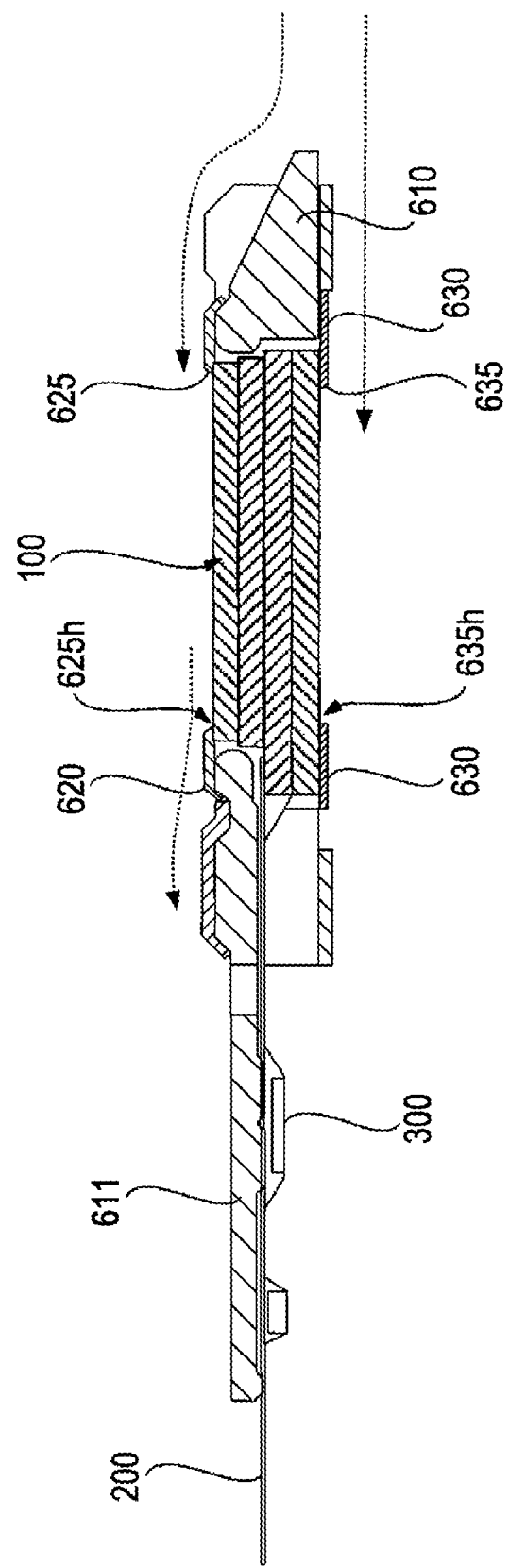
FIG. 9 is a diagram for explaining a flow of a cooling wind supplied to the projector, for example, in the cross-section shown in FIG. 8.

FIG. 9 is a diagram for explaining the flow of a cooling wind supplied to the projector, for example, in the cross-section shown in FIG. 8. In FIG. 9, an example of the flow of the cooling wind in the liquid crystal device is schematically illustrated by a dot line arrow. Therefore, the actual flow of the cooling wind may be different from the flow of the cooling wind indicated by the dot line arrow shown in FIG. 9. As described above, the cooling wind is supplied to the liquid crystal device including the light valves 1100R, 1100G, and 1100B by a unit such as a sirocco fan in the projector 1100. The cooling wind schematically flows along the surface of the mounting case 600, as indicated by the dot line arrow shown in FIG. 9.

In this embodiment, the window section 625 of the first hook 620 is made thin up to the predetermined value, as shown in FIG. 10. Accordingly, thanks to the thickness dO of the window section 625, it is possible to more easily prevent the increase in the stepped portion between the surface of the window section and the surface of the liquid crystal panel 100. Moreover, it is possible to more reliably prevent the increase in the stepped portion between the surface of the window section 625 and the surface of the liquid crystal panel 100 due to the spaced gap between the first hook 620 and the liquid crystal panel 100 in the mounting case 600. Accordingly, in FIG. 9, the cooling wind efficiently flows from the first window 625h to the surface of the liquid crystal device 100 in the first hook 620. By reliably bringing the liquid crystal panel 100 into contact with the first hook 620, it is possible to transfer heat more efficiently from the liquid crystal panel 100 to the first hook 620. Moreover, it is possible to more effectively prevent dust or particles in the first hook 620 from gathering in the circumference of the window section 625 due to the stepped portion between the window section 625 and the liquid crystal panel 100.

In this embodiment, as described with reference to FIG. 10, by making the thickness of the constituent member the first hook 620 thin or forming the member with a material easily subjected to press-processing in order to adjust the thickness d0 of the window section 625 to the predetermined value, the strength of the first hook 620 may deteriorate. In consequence, a disadvantage such as damage may occur, when the first hook 620 becomes deformed due to a relatively strong force applied to the first hook 620 or when a force is added to the liquid crystal panel 100 accommodated in the mounting case 600 through the first hook 620. In order to prevent this disadvantage, the units of the mounting case 600 according to this embodiment preferably have the following distinctive configuration.

In FIG. 4, in the frame 610, protrusion portions 613 are provided at the four positions corresponding to mounting holes 616 of the frame 610. The mounting holes 616 are defined by the constituent member of the frame 610 and used when the liquid crystal device as the liquid valves 1100R, 1100G, and 1100B is mounted in the projector 1100 shown in FIG. 1.

As shown in FIGS. 4, 6, and 7, the protrusion portions 613 are provided on the side of mounting the first hook 620. In addition, as clearly shown in FIG. 6, the protrusion portions 613 are formed to have a height protruding from the surface of the first hook 620. When the side of the first hook 620 is configured to be an installation side in the mounting case 600 in the state where the first hook 620 is mounted in the frame 610 (that is, the mounting case 600 shown in FIG. 6 is installed by setting the protrusion portions 613 as an upper side, but in this case the mounting case 600 is installed by setting the protrusion portions 613 as a lower side), a force occurring due to the installation can be received by the protrusion portions 613 protruding from the surface of the first hook 620. In this way, it is possible to prevent the damage caused due to the relatively strong force added to the first hook 620 and the liquid crystal panel 100 accommodated in the frame 610 through the first hook 620 upon the installation.

When the mounting case 600 is assembled during the manufacture of the liquid crystal device, as described with reference to FIG. 11, the liquid crystal panel 100 is mounted by setting the first hook 620 as the installation surface (that is, by setting the side of providing the protrusion portion 613 as the lower side in FIG. 6) in the state where the liquid crystal panel 100 is mounted and the first hook 620 is mounted in the frame 610. Moreover, even when each process of mounting the second hook 630 in the frame 610 is performed, the force applied to the first hook 620 can be reduced in each process by allowing the protrusion portions 613 to receive the force, as described above. In consequence, it is possible to improve the yield of the manufacturing process.

In this embodiment, the protrusion portions 613 formed at the four positions in FIG. 4 may be formed to serve as a heat dissipating pin and a wind guiding plate. The configuration is not limited to that shown in FIG. 4 and may take an alternative form. For example, the protrusion portions 613 may be formed at the three positions among the four positions and the heat dissipating pin or the wind guiding plate may be formed at one position among the four positions. When the protrusion portions 613 are configured to serve as at least one of the heat dissipating pin and the wind guiding plate, the disposed area thereof in the frame 610 can be made smaller in comparison to a case where the protrusion portions 613, the heat dissipating pin, and the wind guiding plate are independently provided. Therefore, the size of the frame 610 can be easily reduced. In this way, since the size of the mounting case 600 can be reduced, it is possible to make the size of the liquid crystal device smaller. Moreover, by providing the heat dissipating pin, it is possible to increase the area of the surface of the frame 610 in contact with the cooling wind and efficiently flow the cooling wind in FIG. 9. When the wind guiding plate is provided, FIG. 9 shows that the cooling wind flows toward the upper side in the flow of the cooling wind, that is, from the right side to the left side. In this case, by providing the wind guiding plate on the right side, the cooling wind can efficiently flow from the first window 625h to the surface of the liquid crystal panel 100. Accordingly, by providing the heat dissipating pin or the wind guiding plate, it is possible to efficiently dissipate the heat from the frame 610.

Here, as shown in FIGS. 4, 6, and 8, in the frame 610, a heat dissipating section 611 formed by extending a part of the constituent member thereof along the wiring substrate 200 is provided on the side of mounting the first hook 620. In FIGS. 6 and 8, the heat dissipating section 611 is formed so as to transfer heat from the driving IC chip 300 on the wiring substrate 200. In consequence, the heat dissipating section 611 can efficiently dissipate the heat from the driving IC chip 300 to the outside of the liquid crystal device.

Figure 13:
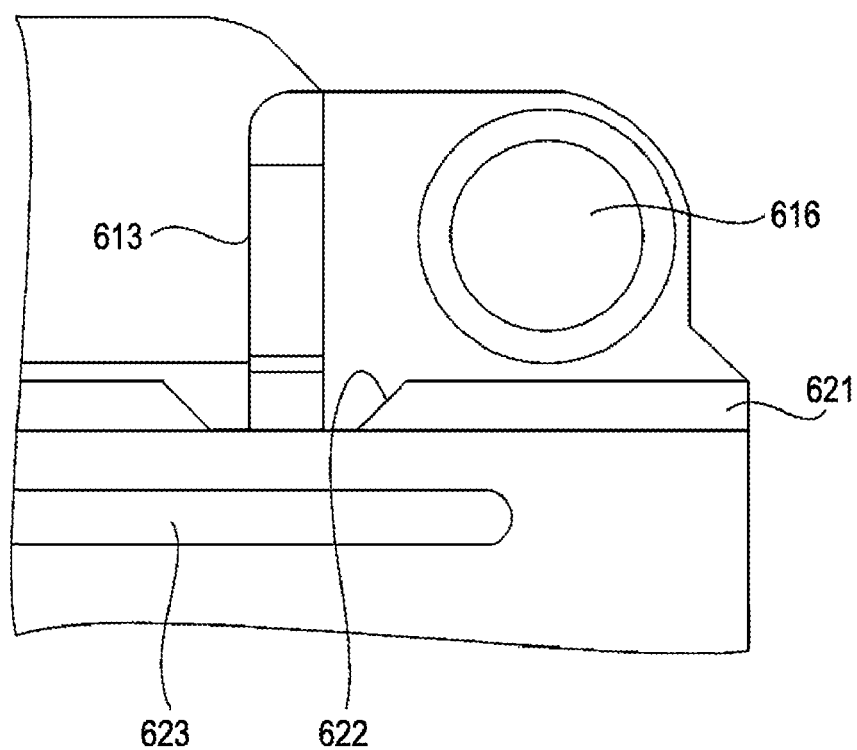
FIG. 13 is an enlarged schematic view illustrating the enlarged portion surrounded by a dot line XIII of FIG. 4.
Figure 15:
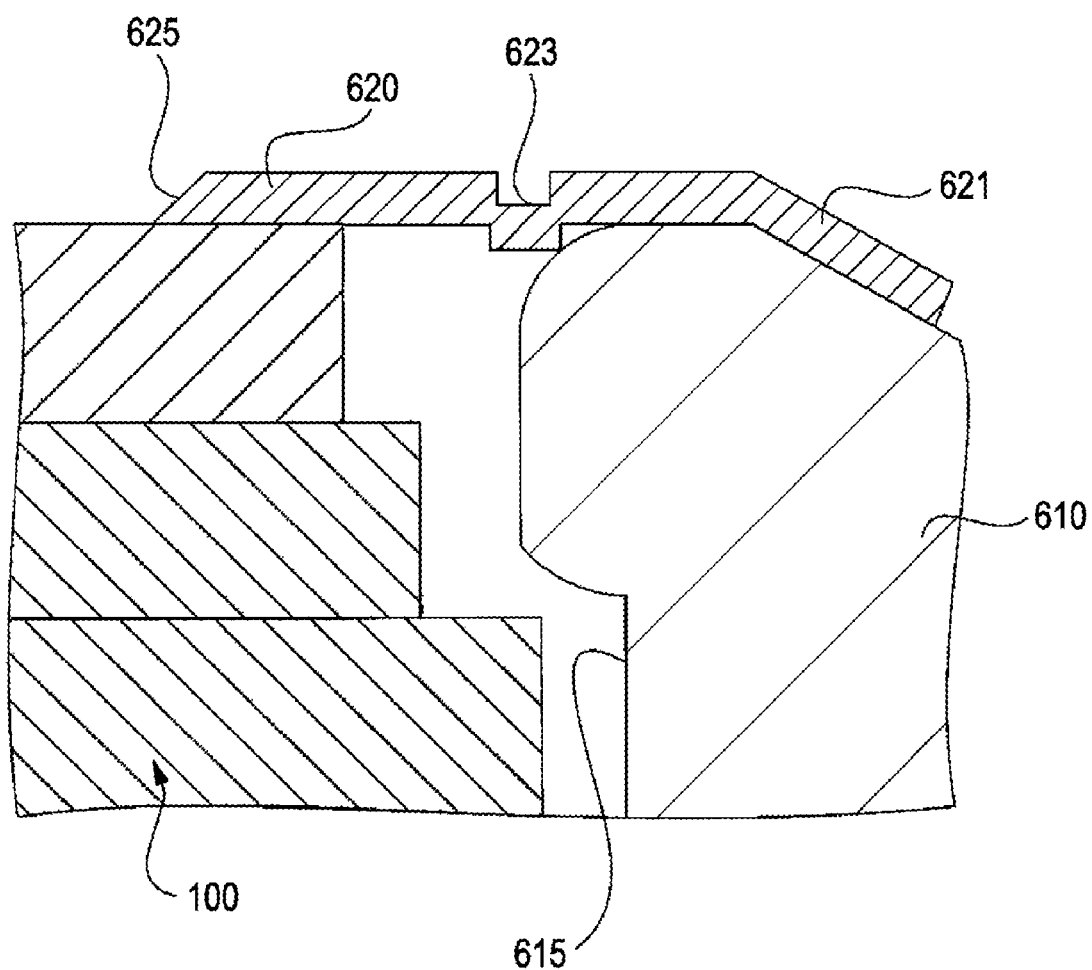
FIG. 15 is an enlarged schematic view illustrating the enlarged portion surrounded by a dot line XV of FIG. 8.

As shown in FIGS. 4, 6, and 8, the first hook 620 has the bent portion 621 formed by bending the circumference of a constituent member thereof. Here, FIG. 13 is an enlarged schematic view illustrating an enlarged portion surrounded by a dot line XIII of FIG. 4. FIG. 15 is an enlarged schematic view illustrating an enlarged portion surrounded by a dot line XV of FIG. 8. As shown in FIG. 15, the bent portion 621 is bent so as to correspond to the surface shape of the opening section 615 coming in contact with the first hook 620 in the state where the first hook 620 is mounted in the frame 610. With such a configuration, the first hook 620 and the wall of the opening section 615 can be put together without a gap. Therefore, since this gap does not occur, it is possible to prevent the liquid crystal panel 100 from being spaced from the first hook 620. Accordingly, it is possible to prevent the stepped portion between the surface of the window section 625 of the first hook 620 and the liquid crystal panel 100 from being increased and efficiently allow the cooling wind to flow from the first window 625h to the liquid crystal panel 100.

The thickness of the constituent member of the first hook 620 is made thin to adjust the thickness of the window section 625. In consequence, when the strength thereof deteriorates, the liquid crystal panel 100 may be pressed down by the elasticity of the second hook 630 in the mounting case 600, a force is added to the first hook 620, and thus the first hook 620 may be deformed. However, by putting the first hook 620 to the wall of the opening section 615 of the frame 610 by the bent portion 621 and pressing the first hook 620 against the frame 610, it is possible to effectively prevent the first hook 620 from being deformed due to the added force.

Figure 14:
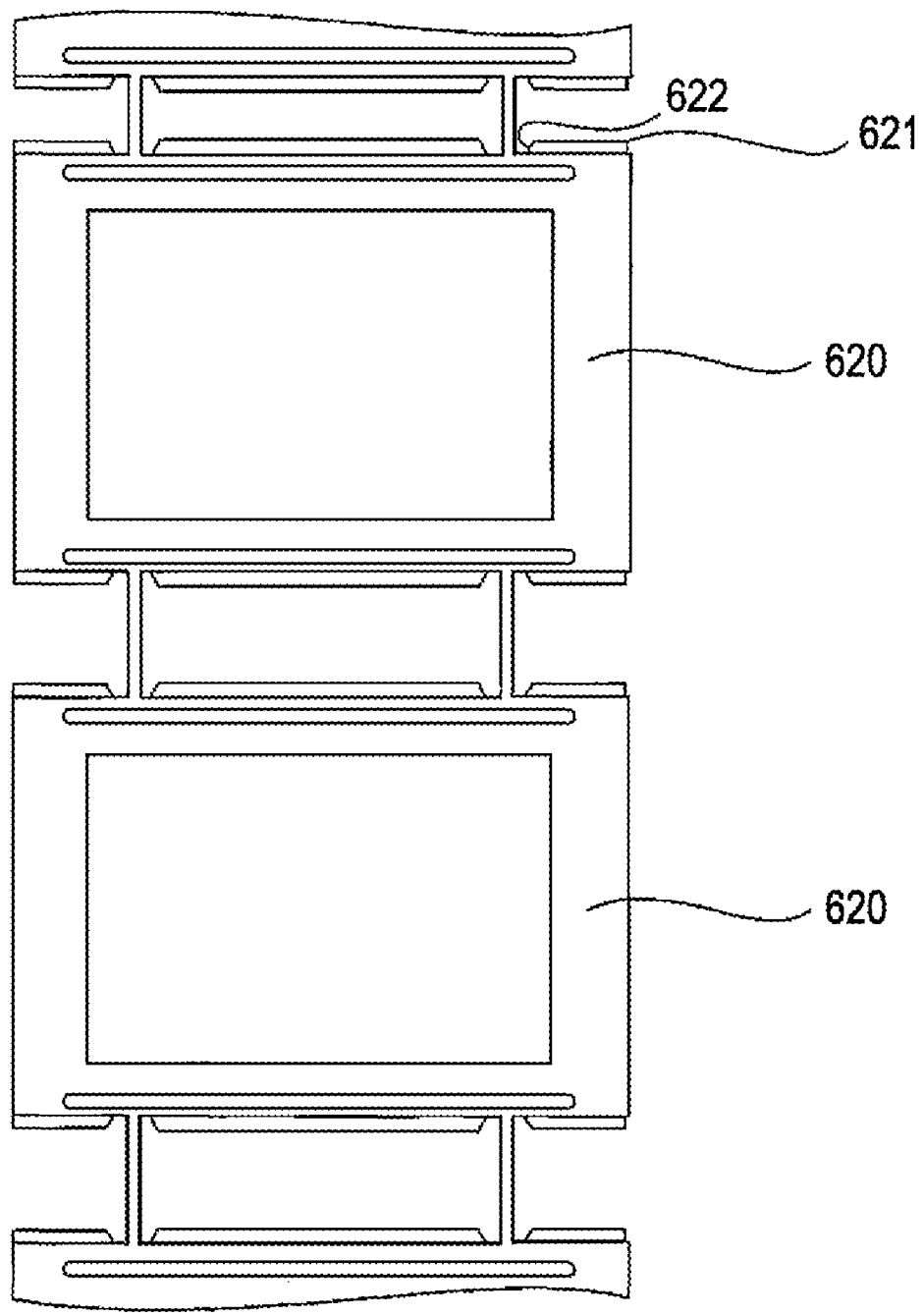
FIG. 14 is a diagram for explaining the manufacture of the first hook by sequential sending manufacture equipment.

In FIGS. 4 and 13, the bent portion 621 includes concave portions 622 formed by partially notching the bent portion. Here, FIG. 14 is a diagram for explaining the manufacture of the first hook by sequential sending manufacture equipment. When the first hook 620 is manufactured using the sequential sending manufacture equipment, as shown in FIG. 14, it is possible to easily manufacture the first hooks by providing the concave portions 622 in the parts of the bent portion 621 and by connecting the several first hooks 620 to each other in the concave portions 622.

In FIGS. 4 and 13, the frame 610 is provided with protrusion portions 613 to correspond to the concave portions 622. The resistance against the force added because the liquid crystal panel 100 is pressed due to the elasticity of the second hook 630, for example, may deteriorate in the concave portions 622 in which the bent portions 621 are void in the first hook 620. However, by disposing the protrusion portions 613 to correspond to the concave portions 622, it is possible to reinforce the strength of the concave portions 622. Accordingly, it is possible to prevent the first hook 620 from being deformed in the concave portions 622 due to the force added when the liquid crystal panel 100 is pressed by the elasticity of the second hook 630. Since the protrusion portion 613 can be formed even in the concave portion 622 as in FIG. 13, the large disposed area thereof can be guaranteed. Moreover, in comparison to a case where a member reinforcing the above-described concave portion 622 is formed in the frame 610 independently from the protrusion portion 613, the size of the frame 610 can be reduced by decreasing an area necessary to form this member and the protrusion portion in the frame 610. Instead of or in addition to the protrusion portions 613 corresponding to the concave portions 622 in the configuration for reinforcing the concave portions 622, a wind guiding plate or a heat dissipating pin may be disposed.

In FIGS. 4 and 13, in the first hook 620, a groove portion 623 is formed along the bent portion 621. In FIG. 15, the groove portion 623 is formed by removing the about half of the thickness of the constituent member of the first hook 620 generally by half punching. Accordingly, the bottom of the groove portion 623 is formed in the first hook 620 so as to protrude from the surface on a side facing the opening section 615 of the frame 610. With such a configuration, the groove portion 623 is disposed so as to be matched with the circumference of the opening section 615 and can serve as a stopper of the bent portion 621 corresponding to the groove portion. Accordingly, it is possible to prevent the location mismatch between the bent portion 621 and the opening section 615 of the frame, and thus more reliably put together the first hook 620 and the wall of the opening section 615 without a gap. Moreover, it is possible to more reliably prevent the first hook 620 from being deformed by the force added when the liquid crystal panel 100 is pressed by the elasticity of the second hook 630.

The configuration for mounting the first hook 620 in the frame 610 will be described with reference to FIGS. 6, 7, 10, and 11. In FIGS. 6 and 7, the first hook 620 includes mounting portions 628 formed by bending a part of the constituent member thereof toward the side surface of the frame 610 shown in FIGS. 10 and 11. The frame 610 includes claw portions 619. The first hook 620 is mounted in the frame 610 by hooking the mounting portions 628 on the claw portions 619. Since the mounting portions 628 are in contact with the wall of the side surface of the frame 610, the heat can be transferred from the first hook 620 to the frame 610. It is preferable that the second hook 630 is also mounted in the frame 610 by hooking the second hook on the claw 619, like the first hook 620.

The first hook 620 may be deformed, since a force dragged by the mounting portion 628 hooked on the claw portion 619 is generated in the state where the first hook is mounted in the frame 610. The mounting portion 628 has a hook portion 626. A fixing portion 617 corresponding to the hook portion 626 is formed in the wall where the claw 619 of the frame 610 is formed. The hook portion 626 is hooked on the fixing portion 617 and fixed by the force of the claw portion 619 dragging the mounting unit 628 in the state where the mounting portion 628 is mounted on the claw portion 619. In this way, the force of the hook portion 626 dragging the mounting portion 628 can be relieved. Accordingly, by mounting the mounting portion 628 on the claw portion 619, it is possible to prevent the first hook 620 from being deformed.

Figure 16:
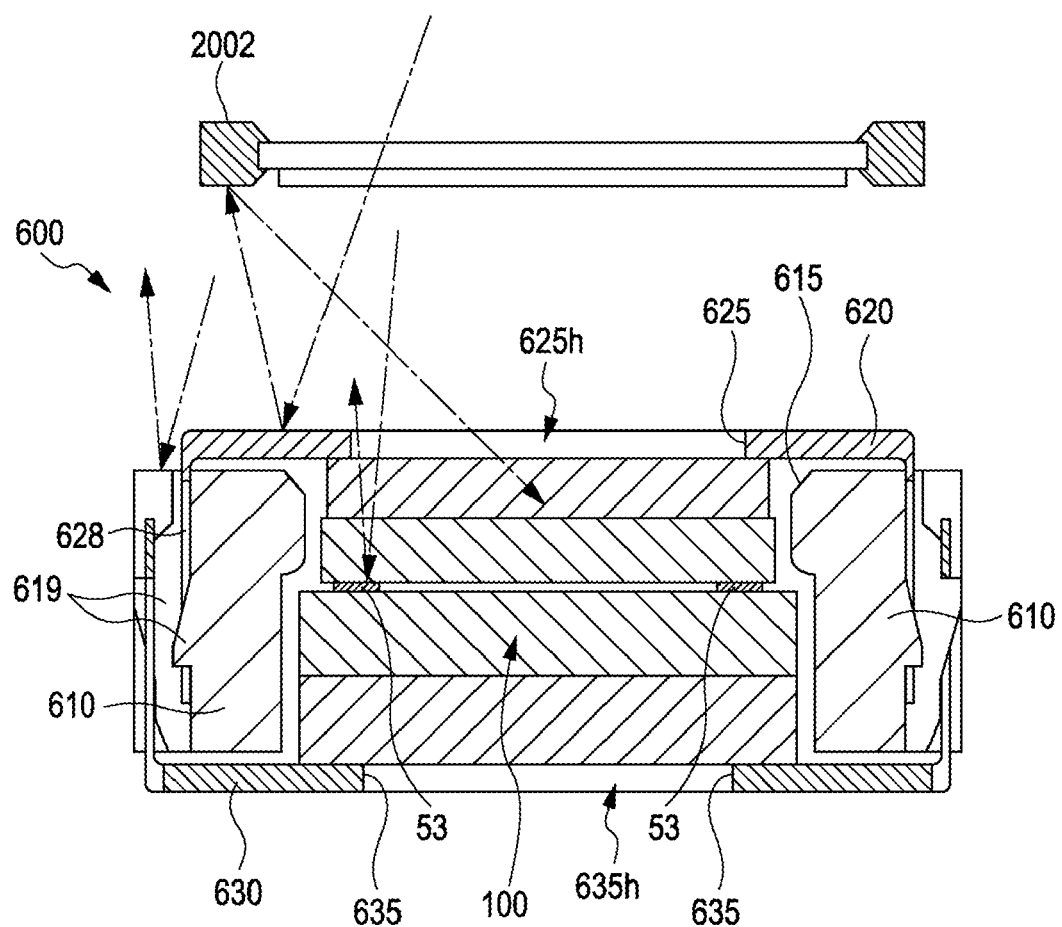
FIG. 16 is a sectional view for explaining the overview of reflection of light arriving in the cross-section shown in FIG. 10 in the liquid crystal device.

FIG. 16 is a sectional view for explaining the overview of reflection of light arriving in the cross-section shown in FIG. 10 in the liquid crystal device. In FIG. 16, the adhesive 640 shown in FIG. 10 is not illustrated.

As described with reference to FIGS. 2 and 3, in the liquid crystal panel 100, the frame light-shielding film 53 is formed in the periphery of the image display area 10a. The invention is not limited to the configuration in which the frame light-shielding film 53 is formed on the counter substrate 20 as described with reference to FIG. 3. A part of the whole of the frame light-shielding film may be provided as an internal light-shielding film on the TFT array substrate 10. The area of the effective picture shown on a screen by the projector 1100 in FIG. 1 is defined by the frame light-shielding film 53.

Dot line arrows in FIG. 16 schematically illustrate an example of a path of the projection light of the projector 1100 in FIG. 1 in the liquid crystal device. In the projection light emitted to the liquid crystal device in the projector 1100 in FIG. 1, light traveling toward the peripheral area outside the image display area 10a is shielded by the frame light-shielding film 53. The light traveling toward the peripheral area outside the image display area 10a of the liquid crystal panel 100 is reflected and shielded on the surface of the first hook 620 and the frame 610 on the light incident side of the mounting case 600.

In this embodiment, in at least one of the frame 610 and the first hook 620, the surface facing the light incident side is at least partially formed of a material having light reflectance lower than that of the frame light-shielding film 53. For example, the frame light-shielding film 53 is formed of chrome (Cr) so as to have the light reflectance of about 50% to about 60% or aluminum (Al) so as to have the light reflectance of 85% or more. The first hook 620 is formed of stainless steel so that the surface on the light incident side at least partially has the light reflectance of about 30% to about 50%. In addition to or instead of the first hook 620, the frame 610 is formed of aluminum (Al) or magnesium (Mg), for example, and subjected to an anti-rust process or the like so that the surface thereof facing the light incident side at least partially has the light reflectance of 20% or less.

As for the surface on the light incident side of the mounting case 600, it is more difficult for light to be reflected from at least a part of the surface of at least one of the frame 610 and the first hook 620 than from the frame light-shielding film 53. Accordingly, in the surface on the light incident side of the mounting case 600, it is possible to restrain the reflection of light which does not contribute to the display since the light travels toward the periphery outside the image display area 10a. As shown in the dot line arrows in FIG. 16, it is possible to restrain stray light generated when the light reflected from the surface of the first hook 620, for example, on the light incident side of the mounting case 600 is again reflected from members disposed on the light incident side, such as an optical member such as a polarizing plate and a member 2002 supporting the optical member in the drawing. As a consequence, it is possible to more effectively prevent the problem that a large amount of stray light is mixed with display light emitted from the image display area 10a.

The projection light in the projector 1100 shown in FIG. 1 is projected as strong light focused by an iris so that an amount of light becomes great in the middle portion of the image display area 10a in the liquid crystal device. That is, in the liquid crystal device, light of which the amount is great in the middle portion of the image display area 10a is incident. Accordingly, the amount of light incident on the liquid crystal device is greater in the vicinity of the edge of the image display area 10a than in the outside of the image display area 10a.

In this embodiment, by allowing the light reflectance of the frame light-shielding film 53 to be relatively high, it is possible to more reliably reflect the strong light traveling toward the vicinity of the edge of the image display area 10a from the frame light-shielding film 53 and thus shield the storing light. Accordingly, it is possible to more reliably prevent the display quality of the liquid crystal device from deteriorating due to a considerable increase in the temperature of the liquid crystal panel 100 caused when the strong light traveling toward the vicinity of the edge of the image display area 10a is incident.

In FIG. 16, the window section 625 of the first hook 620 is partially located further outside than the frame light-shielding film 53 with respect to the image display area 10a. In other words, the frame light-shielding film 53 is partially disposed further inside than the window section 625. It is preferable that the surface on the light incident side of the window section 625 is formed of a material having the light reflectance lower than that of the frame light-shielding film 53, as described above. Accordingly, it is possible to more reliably shield the light, by causing the light traveling toward the vicinity of the edge of the image display area 10a to be reflected from a part of the frame light-shielding film 53 which does not overlap with the window section 625 of which the light reflectance deteriorates.

As indicated by the dot line arrows in FIG. 16, by causing the frame light-shielding film 53 to reflect the light traveling toward the vicinity of the edge of the image display area 10a, it is possible to allow the light to travel in a direction opposite to a side of a light source, while approximating the light to the path of the projection light or the like traveling toward the image display area 10a from the outside of the liquid crystal device. Accordingly, it is possible to restrain the generation of the stray light since the light traveling toward the vicinity of the edge of the image display area 10a reflects from the frame light-shielding film 53.

On the other hand, in FIG. 16, by disposing the window section 625 so as to partially overlap with the frame light-shielding film 53, it is possible to shield the light traveling toward the outside of the image display area 10a of the liquid crystal panel 100 in the overlap portion in a broader area by the frame light-shielding film 53 in addition to the window section 625, while preventing light leakage.

As for the projection light projected as the strong light focused by the iris so that the amount of light becomes greater in the middle portion of the image display area 10a, as described above, the strong light traveling toward the vicinity of the edge of the image display area 10a is reflected from the frame light-shielding film 53, and light having an amount smaller than that of the strong light travels toward the outside of the image display area 10a to be reflected from the window section 625. Accordingly, it is possible to more reliably restrain the generation of the stray light caused due to light reflection in the mounting case 600, while suppressing an increase in the temperature in the liquid crystal panel 100.

In this embodiment, the light reflectance in the first hook 620 can be adjusted independently from the frame 610. Accordingly, by adjusting the light reflectance, light can be adjusted so as to be easily reflected in the first hook 620 independently from the frame 610 and reverse adjustment can be carried out easily. It is preferable that the surface on the light incident side of the first hook 620 faces more broader than the frame 610 so as to have the light reflectance higher that of the frame 610 at least partially. For example, as described above, the first hook 620 is formed so that the surface on the light incident side at least partially has the light reflectance of about 30% to about 50%. In addition, the frame 610 is formed so that the surface facing the light incident side at least partially has the light reflectance of 20% or less. With such a configuration, in the surface of the mounting case 600 on the light incident side, the light which does not contribute to a display since the light travels toward the periphery outside the image display area 10a can be greatly reflected from the first hook 620 facing a side which is broader and on which the light of the liquid crystal device is incident. Accordingly, it is possible to more efficiently prevent the temperature of the liquid crystal panel 100 from being increased due to the high degree of light incident on the liquid crystal panel 100.

The relation with the light reflectance of the surface of the mounting case 600 has been described focusing on the frame light-shielding film 53 of the liquid crystal panel 100 in FIG. 16. However, in addition to or instead of the frame light-shielding film 53, a light-shielding film or the like having the same frame shape as that of the frame light-shielding film 53 may be formed on the dust-proof substrate 121 or 122, for example, in the same manner as that of the above-described frame light-shielding film 53.

In the above-described embodiment, it is possible to achieve a high quality display, while more reliably improving a cooling efficiency in the liquid crystal device.

The invention is applicable to a reflective liquid crystal device (LCOS) forming elements on a silicon substrate, a plasma display panel (PDP), an electrolysis emission display (FED, SED), an organic EL display, a digital micro-mirror device (DMD), an electrophoresis apparatus, or the like in addition to the liquid crystal device according to the above-described embodiment.

The invention is not limited to the above-described embodiment, but may be appropriately modified without departing the gist or spirit of the invention understandable from claims and the specification. An electro-optic device and an electronic apparatus made by the modifications are included in the technical scope of the invention.

What is claimed is:

1. An electro-optic device comprising:
   an electro-optic panel which has a pixel area where a plurality of pixels are disposed; and
   a mounting case including;
      a frame includes an opening section for surrounding the circumference of the electro-optic panel;
      a first cover member mounted in the frame so as to cover the opening section and defining a first window which corresponds to the pixel area; and
      a second cover member mounted in the frame so as to cover the opening section from a side opposite to the first cover member and defining a second window which corresponds to the pixel area, the second cover member having an elastic portion for pressing the electro-optic panel against the first cover member.

2. The electro-optic device according to claim 1, wherein the frame is provided with a protrusion portion protruding from a surface of the first cover member on a side of mounting the first cover member.

3. The electro-optic device according to claim 2, wherein the protrusion portion also serves as a heat dissipating pin for dissipating heat of the frame to the outside of the frame.

4. The electro-optic device according to claim 2, wherein the protrusion portion also serves as a wind guiding plate for guiding a cooling wind to flow from the outside of the frame to the electro-optic panel through the first window in a state where the electro-optic panel is accommodated in the frame.

5. The electro-optic device according to claim 1, wherein the first cover member has a bent portion bent so as to correspond to the surface shape of a wall forming the opening section.

6. The electro-optic device according to claim 5,
   wherein the bent portion has a concave portion which is partially notched, and
   wherein a heat dissipating pin for dissipating heat of the frame to the outside of the frame is formed in the frame to correspond to the concave portion.

7. The electro-optic device according to claim 5,
   wherein the bent portion has a concave portion which is partially notched, and
   wherein the frame is provided with a wind guiding plate for guiding a cooling wind to flow from the outside of the frame to the electro-optic panel through the first window in a state where the electro-optic panel is accommodated in the frame to correspond to the concave portion.

8. The electro-optic device according to claim 5, wherein the first cover member has a groove portion formed along the bent portion and the bottom of the groove portion protrudes from the surface of the first cover member facing the opening section.

9. The electro-optic device according to claim 1,
   wherein the first cover member has a bent portion bent so as to correspond to the surface shape of a wall forming the opening section,
   wherein the frame is provided with a protrusion portion protruding from a surface of the first cover member on a side of mounting the first cover member,
   wherein the bent portion has a concave portion which is partially notched and the protrusion portion is formed to correspond to the concave portion.

10. The electro-optic device according to claim 1,
    wherein the first cover member is provided with a mounting portion for mounting the first cover member in the frame and the frame is provided with a claw portion for hooking the mounting portion for the mounting,
    wherein the mounting portion has a hook portion formed so as to be hooked on a wall provided with the claw portion of the frame in a state where the mounting portion is mounted in the frame, and
    wherein the wall provided with the claw portion of the frame is provided with a fixing portion for fixing the hook portion upon hooking the hook portion.

11. The electro-optic device according to claim 1, wherein the electro-optic device has a light-shielding film formed in a frame shape in the periphery of the pixel area and the surface of the mounting case on a light incident side is at least partially formed of a material having light reflectance lower than that of the light-shielding film.

12. The electro-optic device according to claim 11, wherein the surface of the first cover member on the light incident side is at least partially formed of a material having light reflectance higher than that of the frame.

13. An electronic apparatus comprising the electro-optic device according to claim 1.

* * * * *